(12) United States Patent
Buard

(10) Patent No.: US 6,805,514 B2
(45) Date of Patent: Oct. 19, 2004

(54) TRUNKING CONNECTING DEVICE

(75) Inventor: Yvon Buard, Voutre (FR)

(73) Assignees: Legrand, Limoges (FR); Legrand SNC, Limoges (FR)

( * ) Notice: Subject to any disclaimer, the term of this patent is extended or adjusted under 35 U.S.C. 154(b) by 99 days.

(21) Appl. No.: 09/902,610

(22) Filed: Jul. 12, 2001

(65) Prior Publication Data
US 2002/0006312 A1 Jan. 17, 2002

(30) Foreign Application Priority Data
Jul. 12, 2000 (FR) .............................. 00 09132

(51) Int. Cl.⁷ ................................................ F16B 1/00
(52) U.S. Cl. ....................................... 403/402; 403/403
(58) Field of Search .............................. 403/331, 362, 403/379.1, 379.3, 382, 338, 403, 409.1; 52/220.7, 287.1; D13/155; 138/92, 155, 156, 157, 162; 174/48, 68.3, 86; 312/111, 140

(56) References Cited
U.S. PATENT DOCUMENTS 1,246,585 A * 11/1917 Geraerdts .................... 52/715
3,352,071 A * 11/1967 Sutter .......................... 52/28
3,363,050 A * 1/1968 Martin ....................... 174/101
3,989,398 A * 11/1976 Wendt ....................... 403/230
4,105,051 A * 8/1978 Visentin ..................... 138/162
4,114,326 A * 9/1978 Macuga et al. ............... 52/28
5,435,606 A * 7/1995 Navazo ................... 285/149.1
5,671,580 A * 9/1997 Chou ........................ 52/656.4
5,966,893 A * 10/1999 Quillin ....................... 52/713
6,408,922 B2 * 6/2002 Desrochers .................. 160/24

FOREIGN PATENT DOCUMENTS

FR          2 731 496        9/1996

* cited by examiner

Primary Examiner—Robert J. Sandy
Assistant Examiner—Ruth C. Rodriguez
(74) Attorney, Agent, or Firm—Young & Thompson

(57) ABSTRACT

A device for connecting at least two lengths of trunking includes a plate for joining backs of base sections of the trunking. The plate has on each of its edges adjacent cut edges of the trunking base sections longitudinal tongues which bear on two opposite faces of each back. The tongues are substantially plane, have a thickness from about 0.2 mm to about 1 mm, and bear elastically against the opposite faces of the back.

19 Claims, 5 Drawing Sheets

TRUNKING CONNECTING DEVICE

BACKGROUND OF THE INVENTION

1. Field of the Invention

The present invention relates generally to interconnecting lengths of trunking used to install electrical devices of any kind, such as socket outlets or other devices, and to route electrical cables or conductors connected to them, whether in the form of baseboards when such trunking is installed to form the baseboard at the bottom of a wall, or in the form of moldings when they are installed on the surface of walls, for example alongside the frame of a door or window opening or at the junction between a wall and a ceiling.

The invention relates more particularly to a trunking connecting device including a plate for joining the backs of the trunking base sections, said plate being provided at each of its edges adjacent the cut edges of the trunking base sections with longitudinal tongues adapted to bear on the two opposed faces of each back.

The invention is applied with particular advantage to making corner connecting devices and trunking branch connection or junction devices.

2. Description of the Prior Art

The document FR 2 731 496 (WO96/28681) describes a connecting device as defined above in which the longitudinal tongues of the plate, which are adapted to be applied to the face of the back of trunking facing toward the wall to which said back is fixed, have a certain thickness and therefore a certain stiffness.

In this case, according to the above document, in order not to impede the fixing of the trunking base section to the wall, the longitudinal tongues are received in housings defined by the back of the trunking base section, having a recessed U-shaped section relative to the surface of the back which is applied to the wall to which it is fixed.

Additionally, according to the above document, the longitudinal tongues carried by the plate and intended to be applied to the face of the back opposite that applied to the wall project relative to the face that carries them and have a globally Z-shaped section so that they bear elastically on said face of the back of the trunking base section and compensate play resulting from the assembly of the other longitudinal tongues into the corresponding housings on the opposite face of said back.

The arrangement previously described, apart from the fact that it is relatively complex, requires a special adaptation of the back of the trunking base section.

It is therefore relatively costly to produce.

SUMMARY OF THE INVENTION

To palliate the above problem, the present invention proposes a device for connecting at least two lengths of trunking, including a plate for joining backs of base sections of the trunking, the plate having on each of its edges adjacent cut edges of the trunking base sections longitudinal tongues adapted to bear on two opposite faces of each back, which tongues are substantially plane, have a thickness from about 0.2 mm to about 1 mm, and are adapted to bear elastically against the opposite faces of the back.

In accordance with the invention, the relative thinness of the longitudinal tongue(s) intended to be applied to the face of the back which is applied to the wall to which the trunking is fixed therefore avoids the need for special adaptation of the back of the trunking and of the longitudinal tongues which are applied to the face of the back opposite that which is applied to the wall, which preserves intact the back which is useful for running cables or conductors or for installing electrical devices in said trunking.

Other advantageous and non-limiting features of the connecting device according to the invention include:

three longitudinal tongues on each edge of the plate adjacent a cut edge of a trunking base section are disposed in an arrangement resembling the shape of a winners' podium, two end tongues are positioned on the top face of the plate so as to be placed against the top face of the back of the trunking base section, and a central tongue is positioned on a bottom face of the plate so as to be placed against a bottom face of the back of the trunking base section;

the longitudinal tongues have the same thickness;

the thickness of each longitudinal tongue is approximately 0.5 mm;

the plate is plane and has at least two transverse ends adapted to be placed adjacent two cut edges of two lengths of trunking;

the two transverse ends of the plate are at an angle to each other enabling connection of two lengths of trunking extending in two different directions in the same plane;

the plate has walls on its longitudinal edges adapted to be aligned with lateral flanges of the trunking base sections to provide continuous walls;

the plate carries on its top face a pillar with an orifice through it that opens onto the bottom face of the plate, the orifice forming a passage for a fixing member for fixing the plate to a wall supporting it;

the plate has two parts with an inside or outside corner between them and each edge of each part of the plate adapted to be placed adjacent a cut edge of a trunking base section is provided with longitudinal tongues;

the two parts of the plates are fixed relative to each other;

the parts of the plates are articulated together by a junction part forming a hinge; and the plate is molded in one piece from a plastics material.

The following description, which is given with reference to the accompanying drawings, which are provided by way of non-limiting example, explains in what the invention consists and how it is put into effect

DETAILED DESCRIPTION OF THE PREFERRED EMBODIMENTS

First of all, note that in the embodiments shown in the various figures identical or similar components are identified as far as possible by the same reference symbols and are not described again each time.

Figure 1:
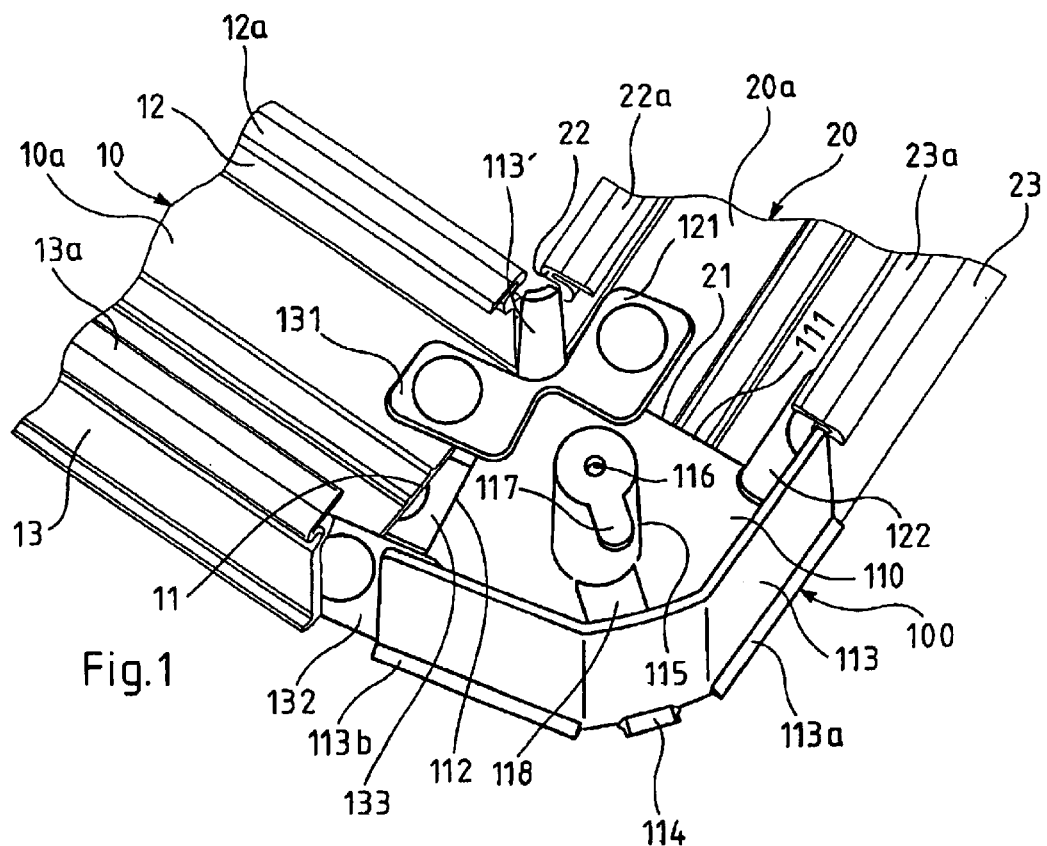
FIG. 1 is a perspective plan view of one embodiment of a connecting device according to the invention installed between two lengths of trunking disposed in a corner.
Figure 2:
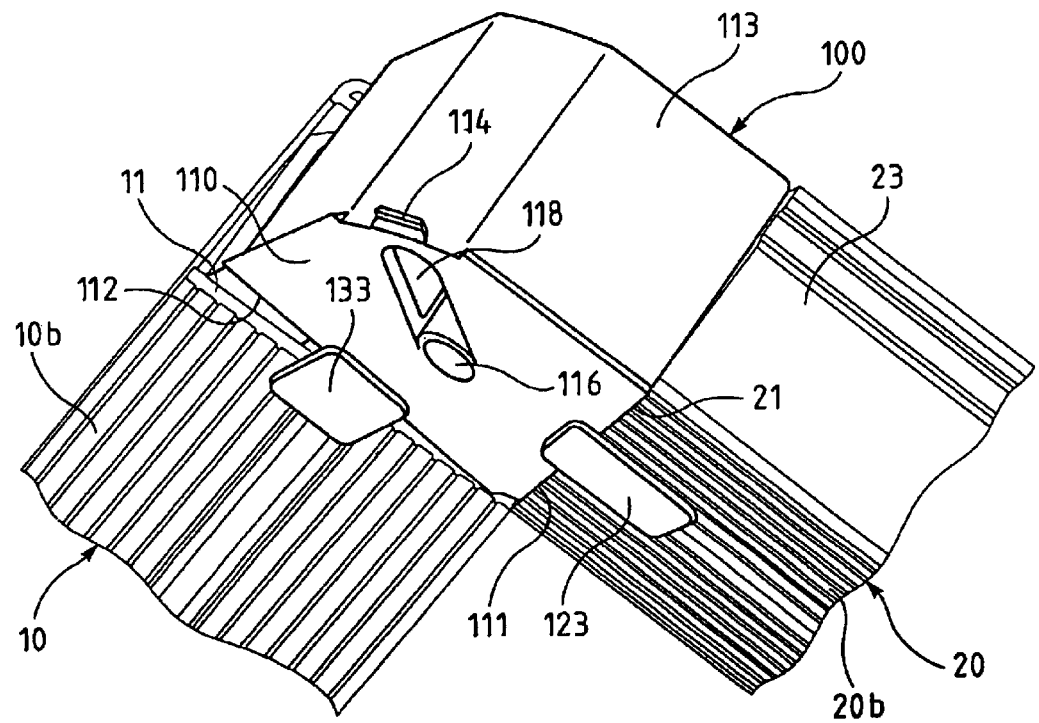
FIG. 2 is a bottom view of the connecting device shown in FIG. 1.

FIGS. 1 and 2 show a first embodiment of a device 100 for connecting two lengths of trunking 10, 20. This particular connecting device 100 is a branch connection device for connecting two lengths of trunking 10, 20 extending in two different directions in the same plane.

Each length of trunking 10, 20 has a U-shaped base section with a back and two lateral flanges 12, 13, 22, 23. Each of the lateral flanges 12, 13, 22, 23 of each length of trunking 10, 20 has at the top a transverse rim 12a, 13a, 22a, 23a on the side toward the interior of the trunking for attaching a cover section (not shown).

The connecting device 100 shown in FIGS. 1 and 2 includes a plate 110 for joining the backs of the base sections of the lengths of trunking 10, 20.

In the embodiment shown, the plate 110 is plane and has two transverse ends 111, 112 adapted to be placed adjacent cut edges 11, 21 of the two lengths of trunking 10, 20.

These two transverse ends 111, 112 of said plate 110 are at an angle to each other for connecting two lengths of trunking 10, 20 extending in two different directions in the same plane at an angle to each other from about 85 degrees to about 95 degrees.

The plate 110 also has, on its longitudinal edges, walls 113, 113' adapted to be aligned with the lateral flanges 12, 13, 22, 23 of the base sections of the lengths of trunking 10, 20 to provide a continuous wall.

The plate 110 carries on its top face a pillar 115 through which extends an orifice 116 that opens onto the bottom face of the plate 110, the orifice forming a passage for a fixing member such as a screw or a brad for fixing said plate 110 to a wall supporting it.

As shown in FIG. 1 in particular, in the top part of the pillar 115 is a tongue 117 projecting from the peripheral surface of said pillar 115 and providing a support for a cover of said plate described later with reference to FIGS. 5 to 7.

To enable the tongue 117 to be extracted from the mold, an orifice 118 of identical shape but with larger dimensions is provided in the plate, facing the tongue 117.

The pillar advantageously avoids the need to fit a fixing member for the plate above the level of the edges of the longitudinal walls 113, 113' extending the lateral flanges of the lengths of trunking, which protects them from being struck with a hammer when driving a fixing brad into a wall via the orifice 116 for fixing the plate 110 to said wall.

Each of the edges 111, 112 of the plate 110 adjacent the cut edges 11, 21 of the base sections of the length of trunking 10, 20 has longitudinal tongues 121, 122, 123, 131, 132, 133 adapted to bear on the two opposite faces 10a, 10b, 20a, 20b of each back of each base section of a length of trunking 10, 20.

The term "longitudinal" refers to the longitudinal direction of the trunking on which said tongues bear.

The tongues 121, 122, 123, 131, 132, 133 are substantially plane and have a thickness from only about 0.2 mm to about 1 mm, preferably about 0.5 mm. They are adapted to bear elastically on said opposite faces 10a, 10b, 20a, 20b of each of the backs of said base sections.

As shown in FIGS. 1 and 2 in particular, three longitudinal tongues 121, 122, 123, 131, 132, 133 as defined above are disposed in an arrangement resembling the shape of a winners' podium, as used at sporting events, on each edge 111, 112 of the plate 110, two end tongues 121, 122, 131, 132 being positioned on the top face of said plate 110 so as to be placed against the top face 10a, 20a of the back of the base section of each length of trunking 10, 20, and a central tongue 123, 133 being positioned on the bottom face of the plate 110 so as to be placed against the bottom face 10b, 20b of the back of the base section of each length of trunking 10, 20.

These longitudinal tongues 121, 122, 123, 131, 132, 133 are rectangular.

These thin plane longitudinal tongues advantageously secure the plate firmly to the base sections of the trunking without forming an additional thickness impeding the fitting of the base sections of the trunking to the wall to which they must be fixed or installing electrical device supports in each of the base sections or routing electrical conductors or cables in the base sections.

Because the longitudinal tongues are thin, the connecting device can be used on any standard trunking base section without any special adaptation of the back of the base section.

Each group of longitudinal tongues provided on an edge of the plate adapted to be positioned adjacent a cut edge of a trunking base section sandwiches the back of the corresponding base section, onto which it is thereby clamped.

By means of these tongues, the plate 110 can be fitted to the base section of the trunking before it is fixed to the wall, the combination of the plate and the trunking, which is easy to manipulate, then being fixed to the wall.

The plate can instead be fixed to the wall first, and the trunking base sections then installed by inserting them between the longitudinal tongues of the plate, which has the advantage of holding the base sections in position before the installer fixes them to the wall, which makes his work easier, especially if he is working alone.

Figure 3:
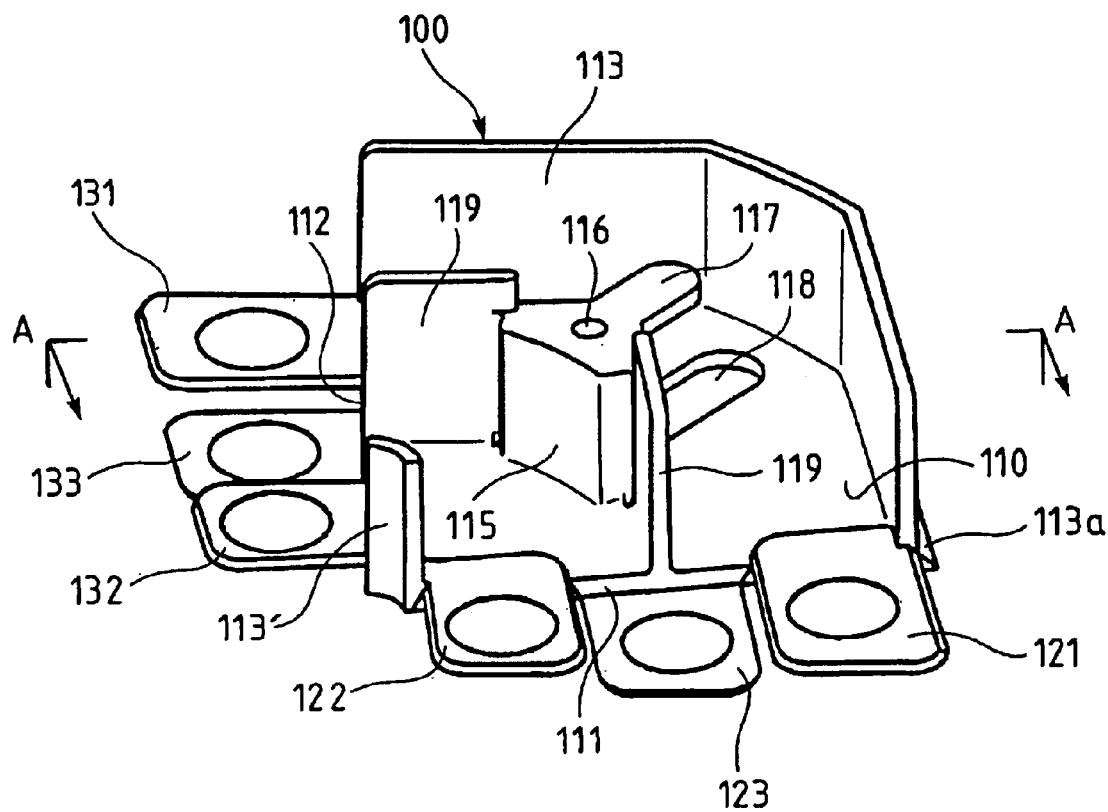
FIG. 3 is a perspective side view of a variant of the connecting device shown in FIG. 1.
Figure 4:
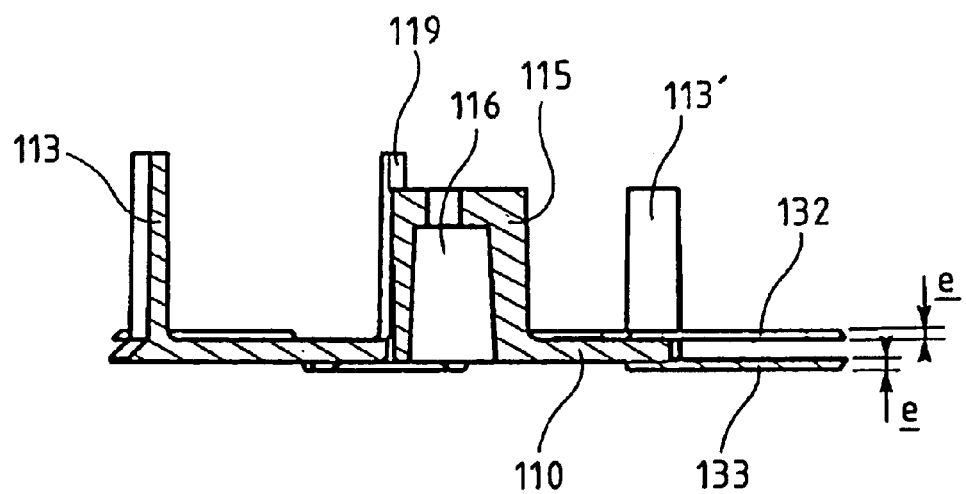
FIG. 4 is a view of the connecting device shown in FIG. 3 in section taken along the line A—A.

FIGS. 3 and 4 show a variant of the connecting device 100 shown in FIGS. 1 and 2; the essential difference is the different shape of the pillar 115, which is substantially a trihedron with the corners cut off; the pillar 115 is extended in two perpendicular directions by vertical partitions 119 extending as far as the transverse edges 111, 112 of the plate 110.

The partitions divide the connecting device 100 into two ducts for routing electrical conductors or cables isolated from each other.

On the other hand, the arrangement of the longitudinal tongue is identical to that of the connecting device 100 shown in FIGS. 1 and 2 and is therefore not described again here.

The thickness e of the longitudinal tongues 121, 122, 123, 131, 132, 133 is identical to that of the longitudinal tongues 121, 122, 123, 131, 132, 133 of the connecting device shown in FIGS. 1 and 2.

Figure 5:
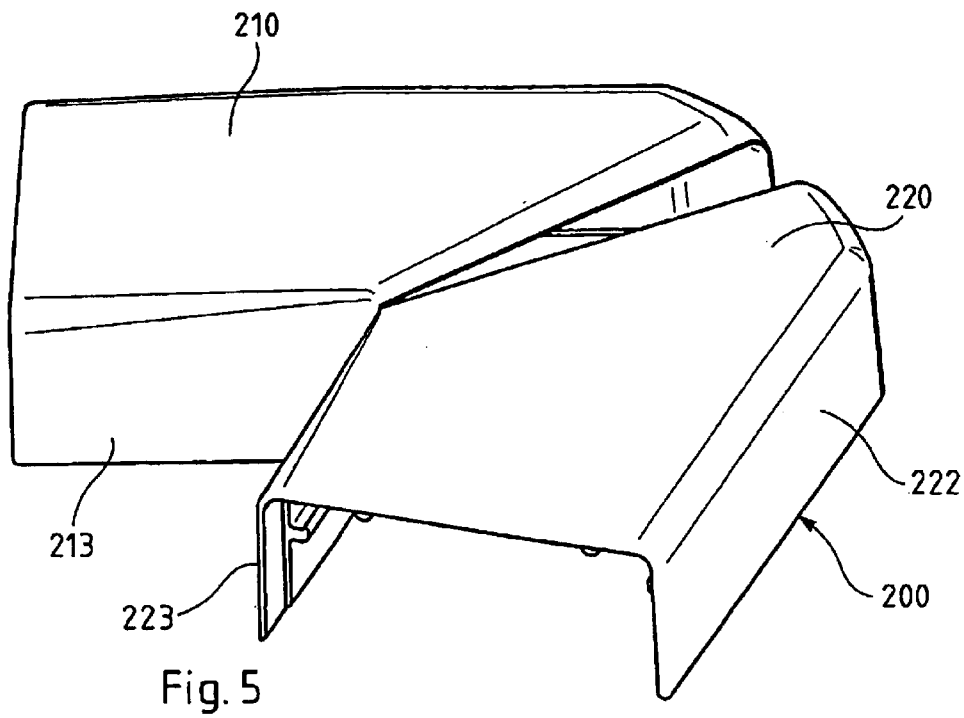
FIG. 5 is a perspective plan view of a cover of the connecting device shown in FIG. 1.
Figure 6:
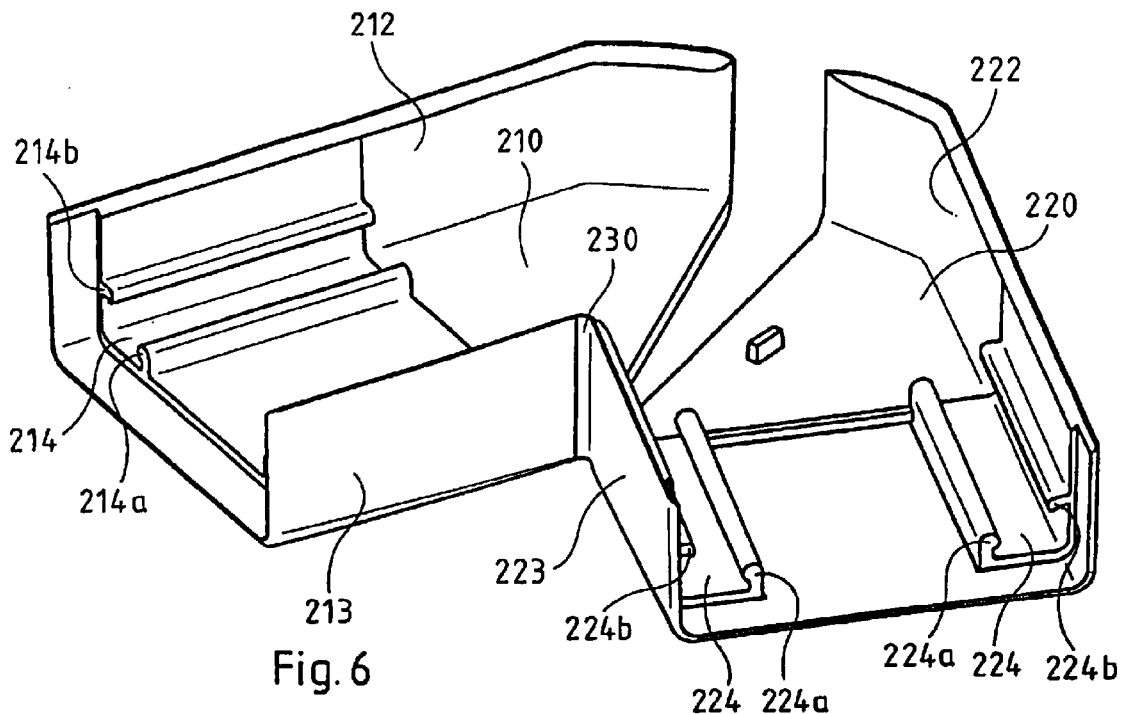
FIG. 6 is a bottom view of the cover shown in FIG. 5.

FIGS. 5 to 7 show one embodiment of a cover 200 of the connecting device 100 shown in FIGS. 1 to 4.

This cover 200 has two parts 210, 220 articulated together by a flexible connecting part 230 forming a hinge, enabling different angular orientations of the two parts 210, 220 relative to each other, according to the relative angular positions of the two lengths of trunking to be connected by the connecting device 100.

Figures 7A, 7B:
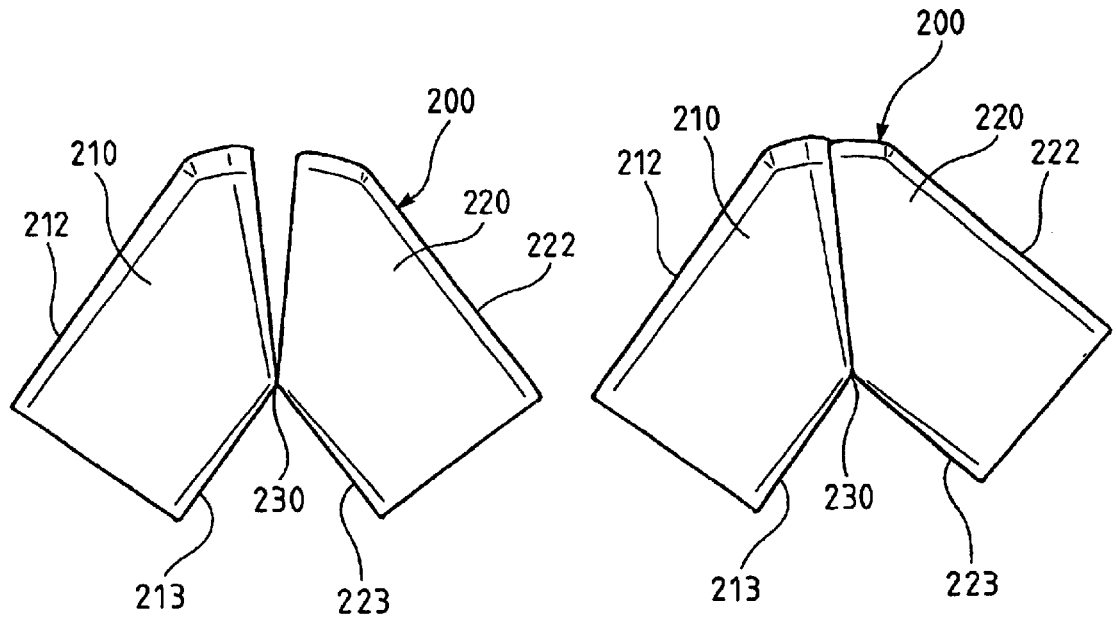
FIGS. 7a to 7d are plan views of the cover shown in FIG. 5 in different angular configurations.
Figures 7C, 7D:
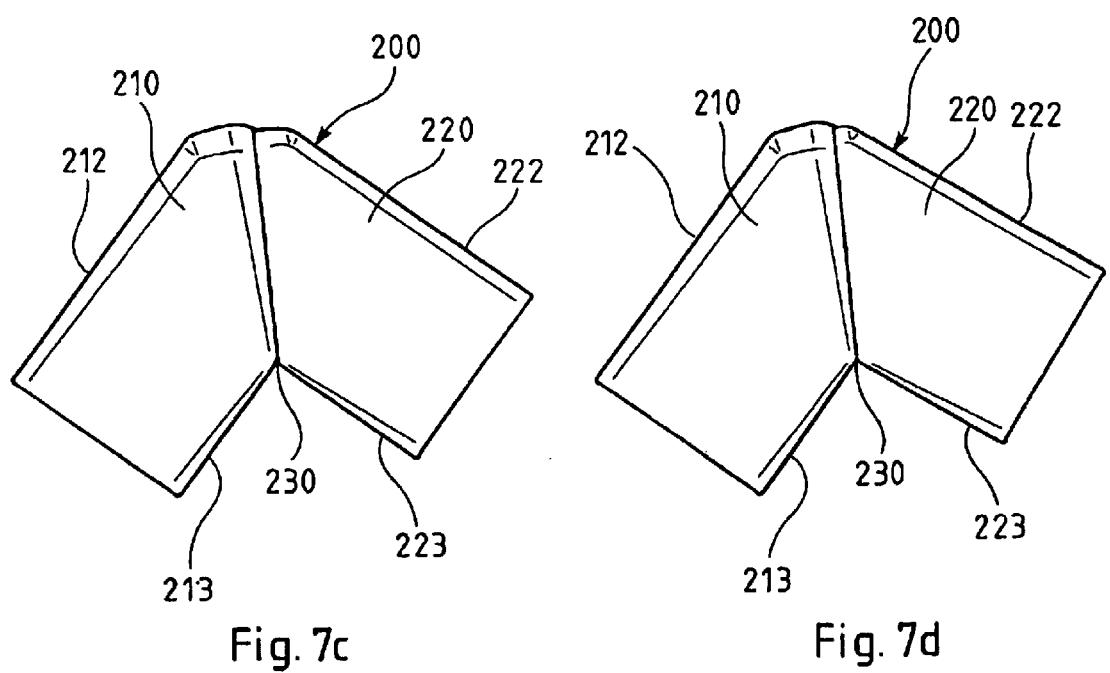

As shown in FIGS. 7b, 7c and 7d in particular, the two parts 210, 220 of the cover 200 can assume three different relative angular positions for angles between the lengths of trunking substantially equal to 85 degrees, 90 degrees and 95 degrees, one of the parts 220 locating under the other part 210 of the cover 200.

As shown in FIG. 7a in particular, the cover 200 is molded in one piece from a plastics material and when it is removed from the mold it has an angle of about 72 degrees between its two part 210, 220.

The various angular positions of the lengths of trunking 10, 20 are obtained by slightly offsetting a cut edge 11 of one of the lengths of trunking 10 relative to the corresponding transverse edge 112 of the plate 110, as shown in FIG. 1 in particular, the range of angular variation being 5 degrees.

As shown in FIGS. 5 and 6, each of the parts 210, 220 of the cover 200 has upstanding longitudinal rims 212, 213, 222, 223 which cover the walls 113, 113' on the longitudinal edges of the plate 110 of the connecting device 100.

The cover 200 hooks onto rims and clips 113a, 113b, 114 provided along the bottom edge of the longitudinal wall 113 carried by the plate 110.

The rims 113a, 113b locate the plate when it is placed along one or more walls, so that the walls do not impede fitting the cover.

Each part 210, 220 of the cover 200 has on its bottom face means 214, 224 for hooking it onto the length of trunking 10, 20.

The hooking means 214, 224 include longitudinal ribs 214b, 214a, 224b, 224a which hook over the inside and the outside of the rims 12a, 13a, 22a, 23a on the lateral flanges 12, 13, 22, 23 of the lengths of trunking 10, 20, in the same way as the cover sections, not shown, of the lengths of trunking.

Of course, in a variant, not shown, of the connecting device shown in FIGS. 1 to 4 the plate 110 could have transverse ends adapted to be positioned adjacent cut edges of parallel lengths of trunking, to constitute a device for joining lengths of trunking extending in the same direction in the same plane.

A connecting device 100 as described above is molded in one piece from a plastics material.

Figure 8:
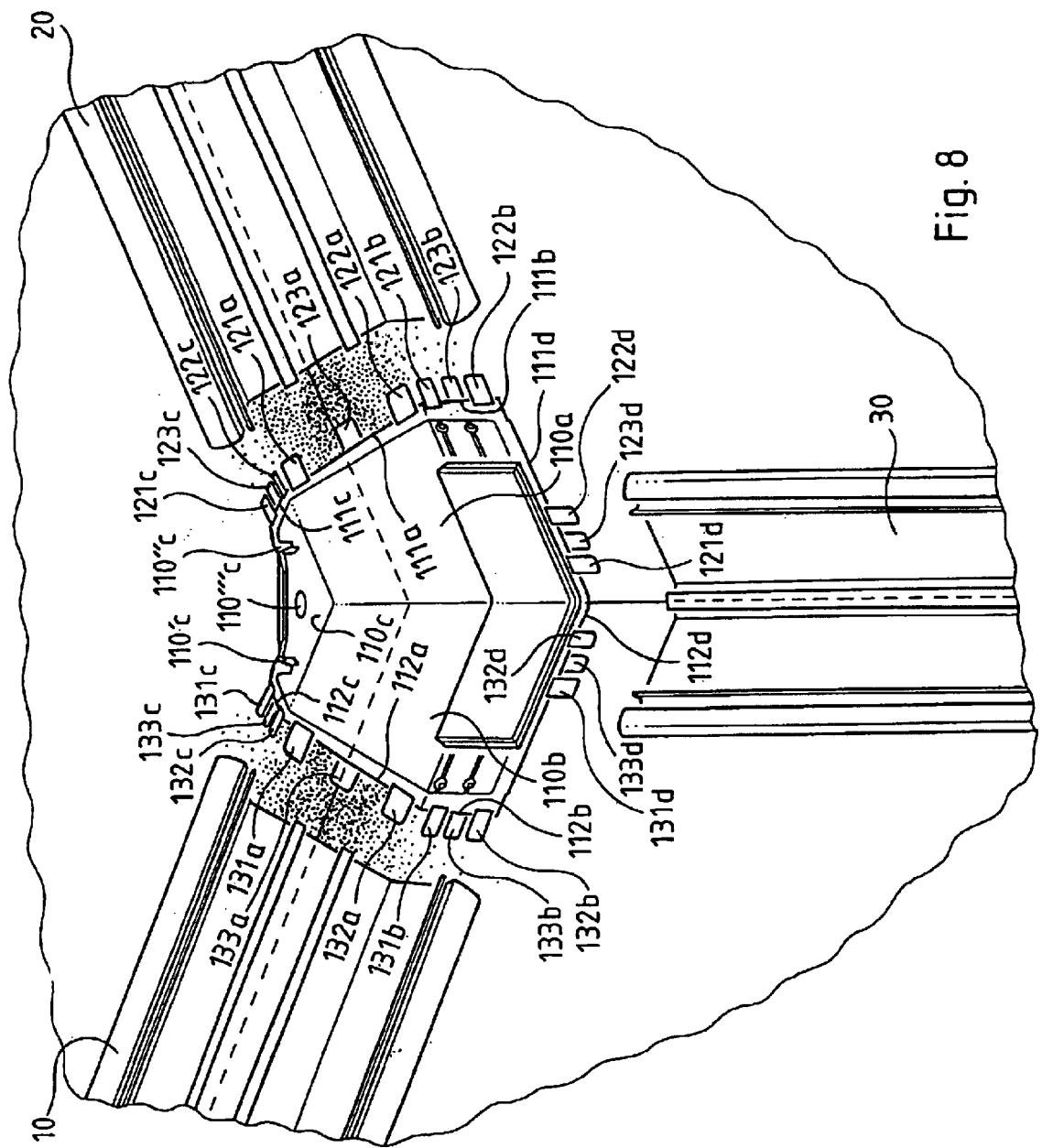
FIG. 8 is a perspective view of a variant of the connecting device according to the invention positioned in a corner where walls meet to provide a junction between three lengths of trunking extending in three different directions.

FIG. 8 shows a different embodiment of the connecting device 100 according to the invention.

In this embodiment, the plate 110 of the device has two parts 110a, 110b with an inside corner between them. In a variant, not shown, the two parts could have an outside corner between them.

The two parts 110a, 110b of the plate 110 are fixed relative to each other, but in another variant, not shown, these parts could be articulated to each other by means of a junction part forming a hinge.

This corner device can be used to join three lengths of trunking 10, 20, 30 extending in three different directions; two lengths of trunking 10, 20 are located at the junction between a wall and a ceiling and have a shape specifically suited to that junction, and the third length of trunking 30 has a V-shaped base section descending from the ceiling toward the floor in the corner where the two walls meet.

Each edge 111a, 111b, 111c, 111d, 112a, 112b, 112c, 112d of each part 110a, 110b adapted to be positioned adjacent a cut edge of a trunking base section 10, 20, 30 is provided with longitudinal tongues disposed in an arrangement resembling the shape of a winners' podium, like the longitudinal tongues described with reference to FIGS. 1 to 4.

Each edge 111a, 111b, 111c, 111d, 112a, 112b, 112c, 112d of each part 110a, 110b of the plate 110 includes two longitudinal end tongues 121a, 122a, 121b, 122b, 121c, 122c, 121d, 122d, 131a, 132a, 131b, 132b, 131c, 132c, 131d, 132d carried by the top face of each part 110a, 110b of the plate 110 and intended to be applied elastically against the top face of a back of a trunking base section or against the bottom face of a lateral flange of a trunking base section.

A central tongue 123a, 123b, 123c, 123d, 133a, 133b, 133c, 133d between the two end tongues and on the bottom face of each part 110a, 110b of the plate 110 is intended to be applied against the bottom face of a back or a lateral flange of a trunking base section.

The longitudinal tongues of the parts 110a, 110b of the plate 110 of the connecting device shown in FIG. 8 have shapes and thicknesses identical to those of the plates of the connecting devices shown in FIGS. 1 and 4 and are not described again in detail.

The connecting device has a top part in the shape of a bracket 110c pressed onto the ceiling with an orifice 110'''c through it through which are passed fixing means for fixing the connecting device to the ceiling.

The top edge of the bracket has hooks 110'c, 110''c for hooking on a cover, not shown.

Of course, a connecting device of the above kind can be adapted to connect three lengths of trunking forming a baseboard and not at the junction between a wall and the ceiling.

The present invention is no way limited to the embodiment described and shown, any variant of which conforming to the spirit of the invention will be evident to the skilled person.

What is claimed is:

1. A device for connecting at least two lengths of trunking adapted to bear against a support surface, said device including a plate for joining backs of trunking base sections, said backs of said trunking base sections having substantially plane rear faces adapted to bear against the support surface and opposed top faces, said plate having a rear face adapted to be flush with said rear faces of said backs and said plate having on each of its edges adjacent transverse edges of said trunking base sections, rear and top longitudinal tongues respectively adapted to bear elastically on the rear face and the opposite top face of the corresponding back, said rear tongues being substantially flat and having a thickness from about 0.2 mm to about 1 mm, said rear tongues being accommodated rearwardly beyond the substantially plane rear faces.

2. The device claimed in claim 1, wherein said plate has two parts with an inside or outside corner between said parts of said plate and each transverse edge of each part of said plate adapted to be placed adjacent a transverse edge of the respective trunking base section is provided with longitudinal tongues.

3. The device claimed in claim 2, wherein said trunking base sections have lateral flanges and wherein said tongues are adapted to bear elastically also on and said lateral flanges of said trunking base sections.

4. The device off claim 2 wherein said parts of said plates are articulated together by a junction part forming a hinge.

5. The device claimed in claim 1, wherein said plate is of a one-piece plastic construction.

6. The device of claim 1, wherein said top tongues are also substantially flat and have a thickness from about 0.2 mm to about 1 mm.

7. The device claimed in claim 6, wherein there are three said longitudinal tongues on each edge of said plate adjacent a transverse edge of a respective one of said trunking base sections, said longitudinal tongues are disposed in an arrangement resembling the shape of a winners' podium, two of said three longitudinal tongues are top longitudinal tongues, spaced from each other and positioned on the top face of said plate so as to bear against the top face of said back of the respective one of said trunking base sections, and a central tongue located between said two top longitudinal tongues is positioned on said rear face of said plate so as to bear against said rear face of said back of said trunking base section.

8. The device claimed in claim 6, wherein said longitudinal tongues have the same thickness.

9. The device claimed in claim 6, wherein the thickness of each of said longitudinal tongues is approximately 0.5 mm.

10. A device for connecting at least two lengths of a trunking adapted to bear against a support surface, said device including a plate for joining backs of trunking base sections, said backs of said trunking base sections having substantially plane rear faces adapted to bear against the support surface and opposed top faces, said plate having a rear face adapted to be flush with said rear faces of said backs and said plate having on each of its edges adjacent transverse edges of said trunking base sections rear and top longitudinal tongues respectively adapted to bear elastically on the rear face and the opposite top face of the corresponding back, said rear tongues being substantially flat and having a thickness from about 0.2 mm to about 1 mm, wherein said plate has at least two said transverse edges adapted to be placed adjacent respective transverse edges of two trunking base sections.

11. The device claimed in claim 10, wherein said two transverse edges of said plate are at an angle to each other enabling connection of two trunking base sections extending in two different directions in the same plane.

12. The device claimed in claim 10, wherein said plate has walls on its longitudinal edges adapted to be aligned and in continuity with lateral flanges of said trunking base sections.

13. The device of claim 10, wherein said top tongues are also substantially flat and have a thickness from about 0.2 mm to about 1 mm.

14. A device for connecting at least two trunking base sections, including a plate for joining backs of said trunking base sections, said plate having on each of its transverse edges adjacent transverse edges of the respective trunking base sections longitudinal tongues adapted to bear on two opposite faces of each of said backs, which tongues are substantially flat, have a thickness from about 0.2 mm to about 1 mm, and are adapted to bear elastically against said opposite faces of said back, wherein said plate has at least two transverse edges adapted to be placed adjacent two transverse edges of respective trunking base sections, and wherein said plate carries on its top face a pillar with an orifice opening onto a rear face of said plate, said orifice forming a passage for a fixing member for fixing said plate to a support.

15. A device for connecting at least two lengths of a trunking adapted to bear against a support surface, said device including a plate for joining backs of trunking base sections, said backs of said trunking base sections having substantially plane rear faces adapted to bear against the support surface and opposed top faces, said plate having a rear face adapted to be flush with said rear faces of said backs and said plate having on each of its edges adjacent transverse edges of said trunking base sections rear and top longitudinal tongues respectively adapted to bear elastically on the rear face and the opposite top face of the corresponding back, said rear tongues being substantially flat and having a thickness from about 0.2 mm to about 1 mm, wherein said plate has two parts with an inside or outside corner between said parts of said plate and each transverse edge of each part of said plate adapted to be placed adjacent a transverse edge of a trunking base section is provided with longitudinal tongues and wherein said two parts of said plates are fixed relative to each other.

16. The device of claim 15, wherein said top tongues are also substantially flat and have a thickness from about 0.2 mm to about 1 mm.

17. A device for connecting two lengths of trunking, the device comprising:

a plate having a flat rear surface arranged and adapted to bear against a support, a top surface opposite said flat rear surface, and two edges that are each arranged and adapted to bear against an edge of a different one of two lengths of trunking when backs of the two lengths of trunking bear against the support;

each of said two edges of said plate having at least one flat bottom tongue that extends beyond the respective one of said edges in a plane parallel to said plate, said bottom tongue adjoining said rear surface of said plate and having a flat bottom that is spaced from said rear surface of said plate by a thickness of said bottom tongue and a flat top that is substantially coplanar with said rear surface of said plate, said flat bottom of said bottom tongue being arranged and adapted to bear against the support and said flat top of said bottom tongue being arranged and adapted to bear against the back of the respective length of trunking; and each of said two edges of said plate having at least one top tongue that extends beyond the respective one of said edges in a plane parallel to said plate, said top tongue adjoining said top surface of said plate and having a bottom that is substantially coplanar with said top surface of said plate and that is arranged and adapted to bear against a front surface of the back of the respective length of trunking, said bottom of said top tongue and said flat top of said bottom tongue being separated by a distance equal to the thickness of said plate.

18. The device off claim 17, wherein the thickness of said bottom tongue is from 0.2 mm to 1 mm.

19. The device of claim 17, wherein each of said two edges of said plate has at least two said top tongues.

* * * * *